United States Patent
Prim

(10) Patent No.: US 9,751,767 B2
(45) Date of Patent: Sep. 5, 2017

(54) CATALYTIC REACTOR FOR CONVERTING CONTAMINANTS IN A DISPLACEMENT FLUID AND GENERATING ENERGY

(71) Applicant: Pilot Energy Solutions, LLC, Houston, TX (US)

(72) Inventor: Eric Prim, The Woodlands, TX (US)

(73) Assignee: Pilot Energy Solutions, LLC, Houston, TX (US)

(*) Notice: Subject to any disclaimer, the term of this patent is extended or adjusted under 35 U.S.C. 154(b) by 5 days.

(21) Appl. No.: 14/505,251

(22) Filed: Oct. 2, 2014

(65) Prior Publication Data

US 2015/0093319 A1   Apr. 2, 2015

Related U.S. Application Data

(60) Provisional application No. 61/885,872, filed on Oct. 2, 2013.

(51) Int. Cl.
*C01B 31/20* (2006.01)
*E21B 43/16* (2006.01)
(Continued)

(52) U.S. Cl.
CPC .............. *C01B 31/20* (2013.01); *B01J 8/025* (2013.01); *B01J 8/0285* (2013.01); *B01J 8/0457* (2013.01);
(Continued)

(58) Field of Classification Search
CPC ........ E21B 43/40; E21B 43/24; E21B 43/164; E21B 43/2406; E21B 43/16;
(Continued)

(56) References Cited

U.S. PATENT DOCUMENTS 4,344,486 A   8/1982 Parrish
4,654,062 A   3/1987 Gottier
(Continued)

FOREIGN PATENT DOCUMENTS

EP         0713091 A1   5/1996
KR   20100064538 A   6/2010
(Continued)

OTHER PUBLICATIONS

Foreign Communication From a Counterpart Application, PCT Application No. PCT/US14/58871, Notification of Transmittal of International Preliminary Report on Patentability dated Sep. 1, 2016, 23 pages.
(Continued)

*Primary Examiner* — Mark Laurenzi
*Assistant Examiner* — Wesley Harris
(74) *Attorney, Agent, or Firm* — Conley Rose, P.C.; Grant Rodolph

(57) ABSTRACT

A method comprises receiving a carbon dioxide recycle stream having carbon dioxide and hydrocarbons. The carbon dioxide recycle stream is fed to a catalytic reactor. The hydrocarbons are converted to carbon dioxide in the catalytic reactor by a catalytic reaction without combustion to form a purified carbon dioxide recycle stream. Electrical energy is generated by using heat produced by the catalytic reactor in the conversion. Another method comprises receiving a recycle stream having carbon dioxide, $C_1$-$C_2$ hydrocarbons, and $C_{3+}$ hydrocarbons. The $C_{3+}$ hydrocarbons are separated from the carbon dioxide and the $C_1$-$C_2$ hydrocarbons. The carbon dioxide and the $C_1$-$C_2$ hydrocarbons are fed to a catalytic reactor at a pressure greater than about 300 pounds per square inch (psi), and the $C_1$-$C_2$ hydrocarbons are converted to carbon dioxide, water, and heat.

18 Claims, 8 Drawing Sheets

(51) Int. Cl.
*E21B 43/24* (2006.01)
*E21B 43/40* (2006.01)
*B01J 8/04* (2006.01)
*B01J 8/06* (2006.01)
*B01J 8/02* (2006.01)

(52) U.S. Cl.
CPC ............... *B01J 8/065* (2013.01); *B01J 8/067* (2013.01); *E21B 43/16* (2013.01); *E21B 43/164* (2013.01); *E21B 43/24* (2013.01); *E21B 43/2406* (2013.01); *E21B 43/40* (2013.01); *B01J 8/0278* (2013.01); *B01J 8/0496* (2013.01); *B01J 2208/00176* (2013.01); *B01J 2208/00849* (2013.01); *B01J 2208/00902* (2013.01); *B01J 2208/00929* (2013.01); *B01J 2208/00938* (2013.01); *B01J 2208/025* (2013.01); *B01J 2208/065* (2013.01); *F25J 2240/70* (2013.01); *F25J 2240/82* (2013.01); *Y02P 90/14* (2015.11); *Y02P 90/70* (2015.11)

(58) Field of Classification Search
CPC   E21B 43/0064; F25J 2240/70; F25J 2240/82; Y02P 90/70; Y02P 90/14
See application file for complete search history.

(56) References Cited

U.S. PATENT DOCUMENTS

| | | | |
|---|---|---|---|
| 5,869,011 A | 2/1999 | Lee | |
| 6,170,264 B1* | 1/2001 | Viteri | B60K 6/24 60/671 |
| 6,248,794 B1* | 6/2001 | Gieskes | C01C 1/0488 423/359 |
| 6,340,002 B1 | 1/2002 | Liebig | |
| 6,352,054 B1 | 3/2002 | Yamada et al. | |
| 6,505,683 B2 | 1/2003 | Minkkinen et al. | |
| 6,669,916 B2 | 12/2003 | Heim et al. | |
| 8,151,553 B1 | 4/2012 | Schechter | |
| 2002/0036086 A1 | 3/2002 | Minkkinen et al. | |
| 2002/0150522 A1 | 10/2002 | Heim et al. | |
| 2003/0045749 A1* | 3/2003 | Nishimura | C07C 51/252 562/523 |
| 2003/0141058 A1 | 7/2003 | Waal | |
| 2007/0031302 A1 | 2/2007 | Wittrup et al. | |
| 2007/0237696 A1 | 10/2007 | Payton | |
| 2007/0266632 A1 | 11/2007 | Tsangaris et al. | |
| 2008/0155984 A1 | 7/2008 | Liu et al. | |
| 2008/0257543 A1 | 10/2008 | De Francesco et al. | |
| 2009/0100754 A1 | 4/2009 | Gil | |
| 2009/0312202 A1 | 12/2009 | Mesters et al. | |
| 2010/0011663 A1 | 1/2010 | Coyle | |
| 2010/0263385 A1 | 10/2010 | Allam | |
| 2010/0282644 A1 | 11/2010 | O'Connor et al. | |
| 2010/0290977 A1 | 11/2010 | Bowers et al. | |
| 2011/0120137 A1 | 5/2011 | Ennis | |
| 2011/0126451 A1 | 6/2011 | Pan et al. | |
| 2011/0197629 A1 | 8/2011 | Prim et al. | |
| 2012/0247105 A1 | 10/2012 | Nelson et al. | |
| 2013/0000320 A1 | 1/2013 | McKenna et al. | |

FOREIGN PATENT DOCUMENTS

| | | |
|---|---|---|
| WO | 2009029353 A1 | 3/2009 |
| WO | 2010076282 A1 | 7/2010 |

OTHER PUBLICATIONS

Foreign Communication From a Counterpart Application, PCT Application No. PCT/US2014/058871, International Search Report dated Jan. 7, 2015, 4 pages.

Foreign Communication From a Counterpart Application, PCT Application No. PCT/US2014/058871, Written Opinion dated Jan. 7, 2015, 11 pages.

* cited by examiner

CATALYTIC REACTOR FOR CONVERTING CONTAMINANTS IN A DISPLACEMENT FLUID AND GENERATING ENERGY

CROSS-REFERENCE TO RELATED APPLICATION

The present application claims priority to U.S. Provisional Patent Application No. 61/885,872, filed on Oct. 2, 2013 by Eric Prim, and entitled "Catalytic Reactor for Converting Contaminants in a Displacement Fluid and Generating Energy," which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enhanced recovery methods are commonly used to increase the amount of hydrocarbons that can be recovered from a reservoir. One enhanced recovery method includes a miscible displacement process. In a miscible displacement process, a displacement fluid (e.g., carbon dioxide with light hydrocarbons) is selected that is miscible with the hydrocarbons to be recovered from the reservoir. The displacement fluid is injected into the reservoir (e.g., through an injection well) and forms a miscible solution with the hydrocarbons. Additional displacement fluid is injected into the reservoir to drive the miscible solution with the hydrocarbons out of the reservoir (e.g., through a recovery well).

Two important parameters in a miscible displacement process include the minimum miscible pressure and the fracture pressure. The minimum miscible pressure is the lowest pressure at which the displacement fluid and the hydrocarbons can become a miscible solution. The fracture pressure is the pressure at which damage (e.g., structural damage) of the reservoir may occur. Accordingly, to use a particular miscible displacement process at a particular reservoir, the minimum miscible pressure should be lower than the fracture pressure. This enables the miscible solution to be formed and driven from the reservoir without damaging the reservoir. Additionally, it may be preferable to operate a miscible displacement process at a pressure above the minimum miscible pressure to prevent low miscibility, unstable displacements, fingerings, and poor recovery. Therefore, it may be desirable to lower a minimum miscible pressure of a displacement fluid.

SUMMARY

In one aspect, the disclosure includes a method comprising receiving a carbon dioxide recycle stream having carbon dioxide and hydrocarbons. The carbon dioxide recycle stream is fed to a catalytic reactor. The hydrocarbons are converted to carbon dioxide in the catalytic reactor by a catalytic reaction without combustion to form a purified carbon dioxide recycle stream. Electrical energy is generated by using heat produced by the catalytic reactor in the conversion.

In another aspect, the disclosure includes a method comprising receiving a recycle stream that comprises carbon dioxide, $C_1$-$C_2$ hydrocarbons, and $C_{3+}$ hydrocarbons. The $C_{3+}$ hydrocarbons are separated from the carbon dioxide and the $C_1$-$C_2$ hydrocarbons. The carbon dioxide and the $C_1$-$C_2$ hydrocarbons are fed to a catalytic reactor at a pressure greater than about 300 pounds per square inch (psi), and in embodiments, as high as 700 psi, and the $C_1$-$C_2$ hydrocarbons are converted to carbon dioxide, water, and heat.

In yet another aspect, a set of process equipment comprises a natural gas liquids (NGL) recovery unit, a catalytic reactor, and a dehydrator. The NGL recover unit is configured to receive a recycle stream and separate the recycle stream into an NGL stream and a carbon dioxide recycle stream, wherein the NGL stream comprises $C_{3+}$ hydrocarbons, and wherein the carbon dioxide recycle stream comprises carbon dioxide and $C_1$-$C_2$ hydrocarbons. The catalytic reactor is configured to receive the carbon dioxide recycle stream and convert the $C_1$-$C_2$ hydrocarbons in the carbon dioxide recycle stream to carbon dioxide by a catalytic reaction without combustion to produce a purified carbon dioxide recycle stream, and the dehydrator is configured to remove water from the purified carbon dioxide recycle stream and feed the dehydrated purified carbon dioxide recycle stream to a hydrocarbon injection well for use in an enhanced oil recovery operation.

These and other features will be more clearly understood from the following detailed description taken in conjunction with the accompanying drawings and claims.

BRIEF DESCRIPTION OF THE DRAWINGS

For a more complete understanding of the disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure include a catalytic reactor for converting contaminants in a displacement fluid and generating energy. In one example, for illustration purposes only and not by limitation, a miscible displacement process uses carbon dioxide as the displacement fluid to recover hydrocarbons from a reservoir. When carbon dioxide is used as the displacement fluid, a miscible solution of carbon dioxide and hydrocarbons is recovered from a recovery well. A carbon dioxide recycle stream is then separated from the heavier hydrocarbons (e.g., $C_{3+}$ or $C_{4+}$ hydrocarbons). The carbon dioxide recycle stream is then fed to a catalytic reactor to convert contaminants and generate energy. For instance, the carbon dioxide recycle stream may include some $C_1$ to $C_3$ hydrocarbons (e.g., methane, ethane, propane, etc.). In such a case, the catalytic reactor converts the $C_1$ to $C_3$ hydrocarbons into carbon dioxide and produces heat. By converting the $C_1$ to $C_3$ hydrocarbons into carbon dioxide, the resulting carbon dioxide recycle stream contains a greater amount of carbon dioxide and a lower amount of contaminants. This may be beneficial in reducing the minimum miscible pressure of the carbon dioxide recycle stream, which can result in greater hydrocarbon recovery from the reservoir. Additionally, the heat generated by the catalytic reactor can be used to generate steam to operate a generator to produce power. Accordingly, in at least certain situations, embodiments of catalytic reactors of the present disclosure can be advantageous in reducing the minimum miscible pressure of a displacement fluid and generating energy. These and other features and advantageous are described in greater detail below.

Figure 1:
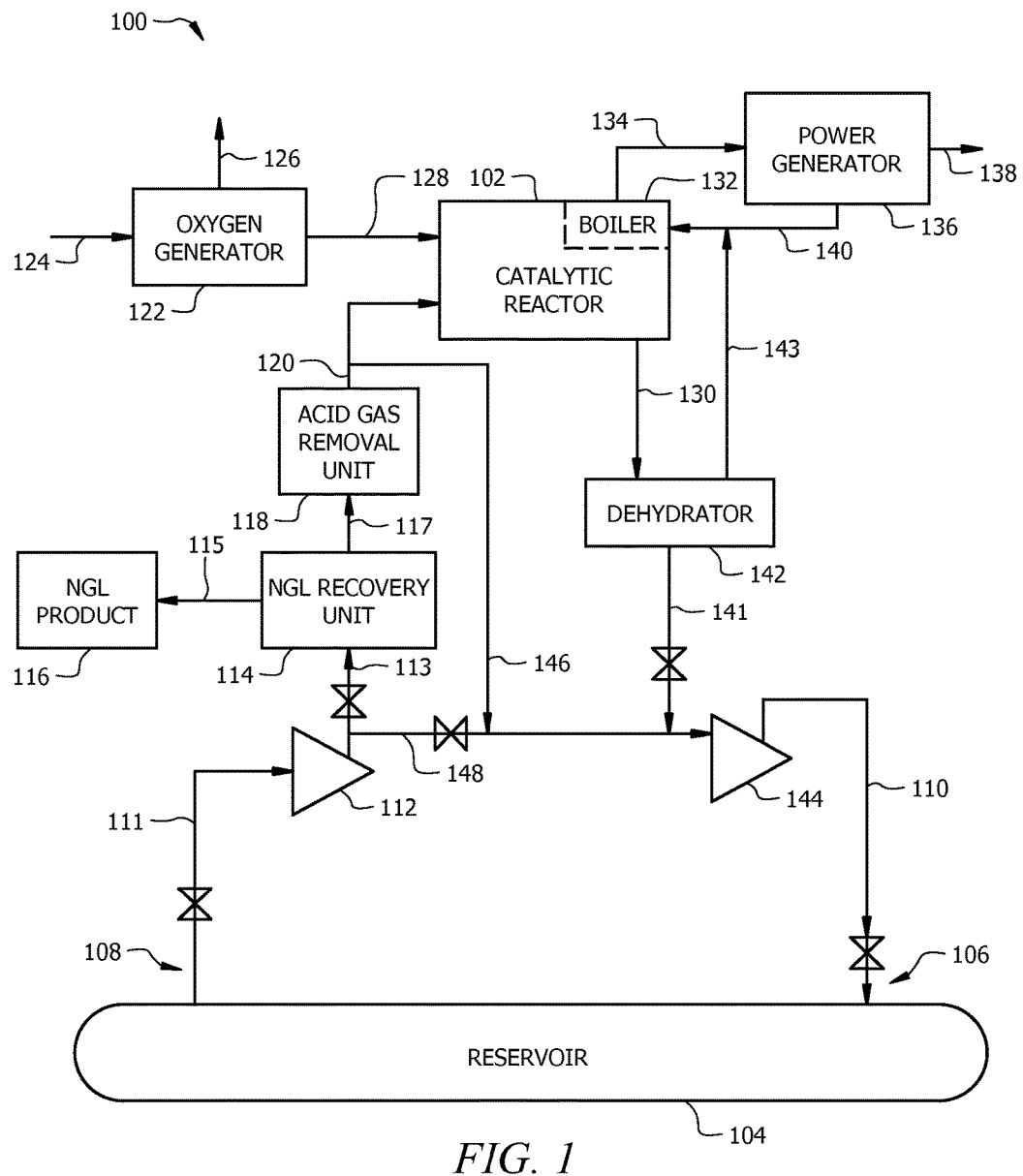
FIG. 1 is a schematic diagram of a miscible displacement system that uses a catalytic reactor to convert contaminants in a displacement fluid and generate energy.

FIG. 1 illustrates a miscible displacement system 100 that uses a catalytic reactor 102 to convert contaminants in a displacement fluid and generate energy. System 100 includes a reservoir 104 having one or more injection wells 106 and one or more recovery wells 108. Reservoir 104 may be an underground reservoir that includes hydrocarbons. In an embodiment, a displacement fluid is fed to injection well 106 through a feed line 110. The displacement fluid may comprise one or more of carbon dioxide, air, water, nitrogen, flue gas, hydrocarbons (e.g., methane, ethane, propane, etc.), or any other suitable displacement fluid. The displacement fluid may form a miscible solution with hydrocarbons in reservoir 104 and drives the miscible solution to the recovery well 108. From the recovery well 108, the miscible solution flows through line 111 and is optionally compressed by one or more compressors 112 (e.g., one to four stages of compressors). The compressed miscible fluid is then fed to a natural gas liquids recovery unit 114 though line 113. A portion of the miscible solution (e.g., in the form of the compressed miscible fluid) may optionally bypass the natural gas liquids recovery unit 114 (e.g., via bypass line 148), as is described in more detail below. The natural gas liquids recovery unit 114 optionally removes $C_{3+}$ or $C_{4+}$ hydrocarbons (e.g., propane and higher hydrocarbons or butane and higher hydrocarbons, respectively) from the compressed miscible solution to generate a natural gas liquids product 116, which may flow through line 115. For example, the natural gas liquids recovery unit 114 may remove from about 20 mol % to about 80 mol % of the $C_3$ hydrocarbons received from line 113; the natural gas liquids recovery unit 114 may remove from about 80 mol % to about 100 mol % of the $C_4$ hydrocarbons received from line 113; the natural gas liquids recovery unit 114 may remove from about 90 mol % to about 100 mol % of the $C_5$ hydrocarbons received from line 113; or combinations thereof. The removed $C_3$ hydrocarbons, $C_4$ hydrocarbons, $C_5$ hydrocarbons, or combinations thereof which form the natural gas liquids product 116 may flow via line 115 from the natural gas liquids recovery unit 114. In certain situations, the natural gas liquids recovery unit 114 may perform the separation without subjecting the miscible solution to any cryogenic conditions, membranes, or carbon dioxide recovery solvents. Some examples of natural gas liquids recovery units that can be used are described in U.S. Patent Application Publication No. 2013/0333417 A1, filed Jul. 19, 2013, by Eric Prim, et al., and entitled "NGL Recovery Without Cryogenic Conditions, Membranes, and Carbon Dioxide Recovery Solvents," and in U.S. Patent Application Publication No. 2013/0298601 A1, filed on Jul. 19, 2013, by Eric Prim, et al., and entitled "Sour NGL Stream Recovery," both of which are herein incorporated by reference in their entirety. However, embodiments are not limited to any specific implementation of natural gas liquids recovery unit 114 and may include any type of natural gas liquids recovery unit 114. Additionally, in some embodiments, a natural gas liquids recovery unit 114 may not be included. For instance, in some cases, a stream (e.g., line 111, line 113, or both) may be relatively lean with respect to heavier hydrocarbons (e.g., $C_{3+}$ or $C_{4+}$ hydrocarbons), and it may not be necessary or economically prudent to remove heavier hydrocarbons (e.g., $C_{3+}$ or $C_{4+}$ hydrocarbons) from the stream prior to being fed to an acid gas removal unit 118 or catalytic reactor 102.

Natural gas liquids recovery unit 114 also generates a lean displacement fluid recycle stream (e.g., a carbon dioxide recycle stream) that is output to line 117. The lean displacement fluid recycle stream in line 117 may be at a pressure of about 300 psi or more, about 400 psi or more, about 500 psi or more, about 600 psi or more, about 700 psi or more, or be in a range of about 300 to about 700 psi. In one embodiment, the lean displacement fluid recycle stream in line 117 comprises about 50 molar % or more carbon dioxide. Alternatively, the lean displacement fluid recycle stream in line 117 may comprise about 60 molar % or more carbon dioxide, about 70 molar % or more carbon dioxide, about 80 molar % or more carbon dioxide, about 90 molar % or more carbon dioxide, about 95 molar % or more carbon dioxide, about 97 molar % or more carbon dioxide, or about 99 molar % or more carbon dioxide. It should also be noted that due to the relatively high carbon dioxide concentration of the lean displacement fluid recycle stream and/or the relatively high pressure that the lean displacement fluid stream may not be combustible. Accordingly, embodiments of the present disclosure that use a catalytic reactor (e.g., catalytic reactor 102) can be used in settings where other processes (e.g., combustion processes) cannot be used.

In embodiments, the carbon dioxide recycle stream may comprise one or more acid gases (e.g., hydrogen sulfide). The lean displacement fluid recycle stream flowing from the natural gas liquids recovery unit 114 in line 117 may undergo a sweetening process in an acid gas removal unit 118 to remove all or a portion of any acid gases. The sweetened displacement fluid recycle stream then flows from the acid gas removal unit 118 through line 120 to catalytic reactor 102. A portion of the sweetened displacement fluid recycle stream may optionally bypass the catalytic reactor 102 (e.g., via bypass line 146), as is described in more detail below.

While atmospheric air could be fed into catalytic reactor 102, it is generally preferable to minimize or prevent the introduction of nitrogen gas into system 100 because nitrogen may raise the minimum miscible pressure of the injectable displacement fluid recycle stream (e.g., the displacement fluid that is fed to injection well 106 through feed line 110). System 100 may also comprise an oxygen generator 122. Oxygen generator 122 may receive air (e.g., from the atmosphere, through line 124, or both) and may separate the air into a nitrogen-rich stream (e.g., which flows through line 126) and an oxygen-rich gas (e.g., which flows through line 128). In some cases, the oxygen-rich stream in line 128 may still include some nitrogen. For instance, the oxygen-rich stream in line 128 may comprise about 80 molar % oxygen, about 90 molar % oxygen, about 95 molar % oxygen, about 98 molar percent oxygen, or about 99 molar percent oxygen, with the balance composition being substantially all nitrogen. In a specific example, the oxygen-rich gas in line 128 may comprise about 92 to about 96 molar % oxygen and about 4 to about 8 molar % nitrogen. Although nitrogen can increase a minimum miscible pressure, the amount of nitrogen that is introduced is an order of magnitude less than the amount carbon dioxide produced by converting hydrocarbons to carbon dioxide in the catalytic reactor 102. Accordingly, system 100 may improve the minimum miscible pressure of an injectable displacement fluid recycle stream despite introducing some nitrogen. The separation within the oxygen generator 122 is optionally performed using or without using any cryogenic or other liquification processes. The nitrogen-rich stream may be either released to the atmosphere or captured and retained for some other use, and the oxygen-rich gas may be fed to the catalytic reactor 102 through line 128. However, in another embodiment, system 100 does not need to include an oxygen generator 122. Instead, an alternative source of oxygen (e.g., tanks of oxygen) can be used to provide oxygen for system 100.

Catalytic reactor 102 optionally includes one or more catalysts. Some examples of catalysts include, but are not limited to, catalysts which comprise nickel, iron, noble metals (e.g., palladium, platinum, silver, gold, iridium, osmium, rhodium, ruthenium), etc. The catalysts may be supported on an inorganic support such as silica, alumina, other supports known in the art with the aid of this disclosure, or combinations thereof. Catalytic reactor 102 receives the oxygen-rich gas through line 128 and the sweetened displacement fluid recycle stream through line 120 and uses the one or more catalysts to convert contaminants (e.g., hydrocarbons) received from the sweetened displacement fluid recycle stream line 120 to one or more different chemicals (e.g., carbon dioxide, water, reaction products known to those skilled in the art with the aid of this disclosure, etc.). The different chemicals illustratively improve (e.g., lower) the minimum miscible pressure of the sweetened displacement fluid recycle stream received from line 120. For instance, in an embodiment in which system 100 uses carbon dioxide as the displacement fluid and the sweetened displacement fluid recycle stream in line 120 contains $C_{2-}$ or $C_{3-}$ hydrocarbons as contaminants, catalytic reactor 102 converts the $C_{2-}$ or $C_{3-}$ hydrocarbon contaminants into carbon dioxide, water, and heat. Within catalytic reactor 102, the hydrocarbons and oxygen from the oxygen-rich stream received from line 128 undergo chemical reactions according to the following equations:

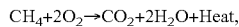
$$CH_4+2O_2 \rightarrow CO_2+2H_2O+Heat,$$

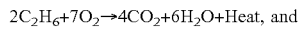
$$2C_2H_6+7O_2 \rightarrow 4CO_2+6H_2O+Heat, \text{ and}$$

$$C_3H_8+5O_2 \rightarrow 3CO_2+4H_2O+Heat.$$

The chemical reactions shown above result in a reacted displacement fluid recycle stream emitted from the catalytic reactor 102 in line 130 that may include carbon dioxide, water, and little or none of the hydrocarbons originally present (e.g., less than about 0.1 molar % of the feed hydrocarbons). In embodiments, the catalytic reactor may convert about 80 molar % or more of the hydrocarbons, about 90 molar % or more of the hydrocarbons, about 95 molar % or more of the hydrocarbons, about 98 molar % or more of the hydrocarbons, or about 99 molar % or more of the hydrocarbons to carbon dioxide and water. As such, the reacted displacement fluid recycle stream in line 130 that is output by catalytic reactor 102 contains a greater amount of the displacement fluid (e.g., carbon dioxide) and fewer contaminants (e.g., $C_{2-}$ or $C_{3-}$ hydrocarbons), which lowers the minimum miscible pressure of the reacted displacement fluid recycle stream in line 130.

In certain embodiments, the catalytic reactor 102 converts the contaminants solely through the use of catalytic reactions, and no traditional combustion methods are used in the catalytic reactor 102 (e.g. the catalytic reactor 102 does not contain a burner or other ignition source). For instance, high operating pressures (e.g., about 300 psi or more) and/or high carbon dioxide concentrations (e.g., about 50 molar %, about 60 molar %, about 70 molar %, about 80 molar %, about 90 molar %, about 95 molar %, about 97 molar %, or about 99 molar % or more carbon dioxide) can prevent combustion from being able to occur. Accordingly, the catalytic reactor 102 may be configured to convert the contaminants using only catalytic reactions without traditional combustion methods.

Catalytic reactor 102 may also include a boiler 132. Boiler 132 may receive the heat energy produced by the chemical reaction in catalytic reactor 102. Boiler 132 may use that heat energy to boil water or another heat exchange fluid to produce a steam that is fed to a power generator 136 (e.g., a steam turbine power generator) through line 134 or is used for other purposes. Power generator 136 may use the steam received from line 134 to generate power 138. Power 138 can be used to power system 100 or can be captured and used for other purposes. Additionally, water or other heat exchange fluid condensate produced by the power generator 136 may be returned to boiler 132 via line 140 and reused to generate more steam or other vapor.

In one embodiment, catalytic reactor 102 and boiler 132 may be implemented using a shell and tube heat exchanger with catalysts within the tubes. In such a case, the oxygen-rich gas in line 128 and the sweetened displacement fluid recycle stream in line 120 are fed to the tubes and the contaminants are converted to the other chemicals within the tubes. The heat produced from the conversion is transferred from within the tubes to water or another heat exchange fluid that is contained in the shell side (e.g. between the outside of the tubes and the shell wall). The heat transfer causes the water or other heat exchange fluid to boil to produce steam or vapor.

The reacted displacement fluid recycle stream may flow from the catalytic reactor 102 through line 130 to be processed through a dehydrator 142. Water can be contained in the displacement recycle stream in line 111 as it leaves the recovery well 108 (and thus carried through system 100 as the displacement recycle stream flows therethrough) and/or water may be added to the displacement recycle stream through the chemical reaction(s) that occur in catalytic reactor 102. Dehydrator 142 can remove all or a portion of water contained in the reacted displacement fluid recycle stream of line 130. In one embodiment, dehydrator 142 comprises molecular sieves, a glycol (e.g., diethylene glycol, triethylene glycol, etc.) dehydrator or any other suitable type of dehydrator. In addition to or instead of dehydrator 142, system 100 may also include one or more heat exchangers or other mechanisms to remove water from reacted displacement fluid recycle stream contained in line 130 by cooling the reacted displacement fluid recycle stream from line 130 to condense water. Some or all of the water removed either in a heat exchanger and/or in a dehydrator 142 may be fed back to the boiler 132 (e.g., via line 140 and 143) and can be used to generate steam or can be discarded.

From dehydrator 142, dehydrated displacement fluid recycle stream may flow through line 141 for processing through one or more compressors 144 (e.g., one to two stages of compressors) to generate the injectable displacement fluid recycle stream in feed line 110 having a higher pressure than in bypass line 148 and/or line 141, which is re-injected to the injection well 106. Typical reinjection pressures may be in the range of from about 1,500 psi to about 2,000 psi. Higher injection pressures may improve miscibility. In embodiments having no dehydrator 142, the reacted displacement fluid recycle stream may flow from the catalytic reactor 102 through line 130 for processing through one or more compressors 144 (e.g., one to two stages of compressors) to generate the injectable displacement fluid recycle stream in line 110 having a higher pressure, which is re-injected to the injection well 106.

As described briefly above, system 100 may optionally include one or more bypass lines 146 and/or 148. Bypass line 146 may take a portion of the sweetened displacement fluid recycle stream in line 120 positioned between the natural gas liquids recovery unit 114 and the catalytic reactor 102 and may redirect the portion to a later portion of the process (e.g., upstream of compressors 144). Bypass line 148 may take a portion of the miscible solution in line 113 between the natural gas liquids recovery unit 114 and compressors 112, and may redirect the portion to a later portion of the process (e.g., upstream of compressors 144). Accordingly, bypass lines 146 and/or 148 can be used to control an amount of the miscible solution that is processed by natural gas liquids recovery unit 114 and/or catalytic reactor 102.

FIGS. 2-8 illustrate various alternative for the system 100. Unless otherwise stated, the alternative embodiments use and produce stream compositions having pressures and temperatures similar to those described above.

Figure 2:
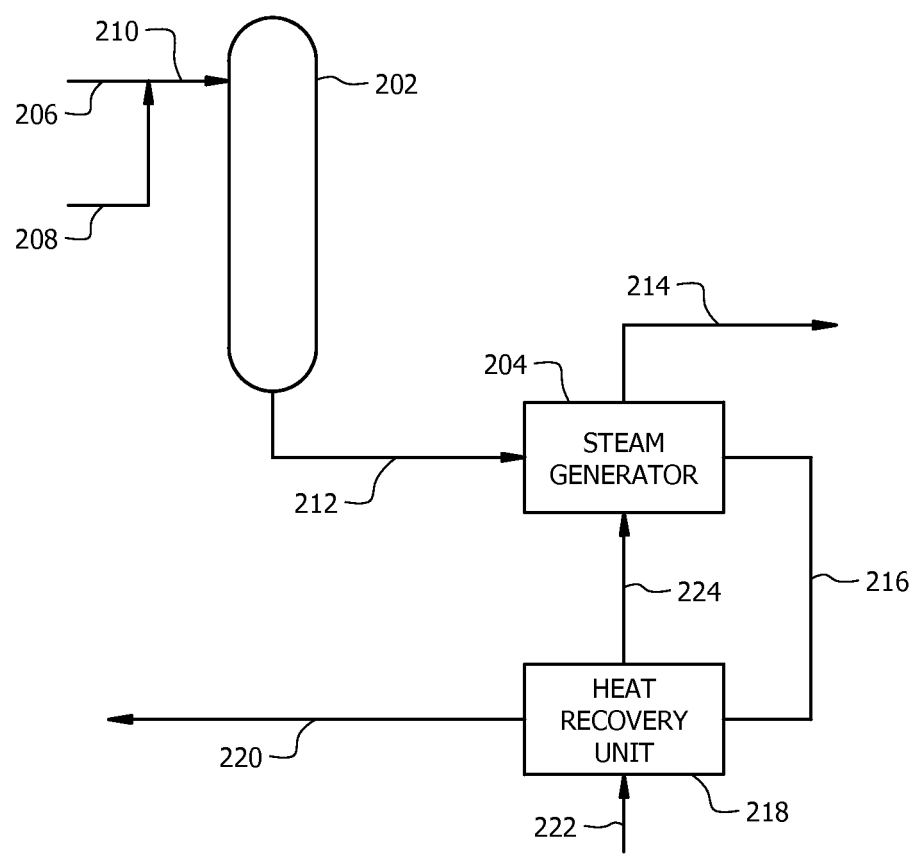
FIG. 2 is a schematic diagram of a single fixed bed reactor system.

FIG. 2 illustrates a system 200 that uses a single fixed bed reactor 202 and a separate steam generator 204. The single fixed bed reactor 202 and separate steam generator 204 can be used in addition to, or in place of, the combined catalytic reactor 102 and boiler 132 in FIG. 1.

In system 200, the displacement fluid recycle stream in line 206 (e.g., comprising the sweetened displacement fluid recycle stream in line 120 of FIG. 1 or a reactor effluent from the catalytic rector 102) may be combined with an oxygen-rich stream in line 208 (e.g., the gaseous stream in line 128 of FIG. 1) to yield a combined stream 210 that is fed to fixed bed reactor 202. In alternative embodiments, lines 206 and 208 may feed to the reactor 202 separately. Contaminants in the displacement fluid recycle stream in line 206 undergo a chemical reaction to convert the contaminants to different chemicals (e.g., methane to carbon dioxide and water, etc.). Similar to the system 100 in FIG. 1, system 200 may convert the contaminants solely using catalytic reactions and no combustion occurs within the fixed bed reactor 202. The chemical reactions may also generate heat, which increases the temperature of the reacted displacement fluid recycle stream in line 212 as compared to the input combined stream 210.

The reacted displacement fluid recycle stream may flow in line 212 to a steam generator 204. Steam generator 204 absorbs heat from the reacted displacement fluid recycle stream received via line 212 to generate steam, which is fed to a power generator (e.g., power generator 136 of FIG. 1) via line 214 to produce electric power. Steam generator 204 may be a boiler, heat exchanger, or any other apparatus configured to receive the reacted displacement fluid recycle stream in line 212 and generate steam.

The first cooled displacement fluid recycle stream may flow from the steam generator 204 through line 216 and optionally pass through a heat recovery unit 218, which may further cool the first cooled displacement fluid recycle stream to generate a second cooled displacement fluid recycle stream in line 220. For instance, heat recovery unit 218 may comprise a heat exchanger that receives water stream via line 222. Water stream received from line 222 absorbs some of the heat energy of the first cooled displacement fluid recycle stream received from line 216 in the heat recovery unit 218, and the heated water is returned in line 224 to the steam generator 204 where it can be used to generate steam. In one embodiment, water stream in line 222 may include condensate from a power generator (e.g., power generator 136 of FIG. 1). However, water stream in line 222 is not limited to coming from any particular source. In addition, any suitable heat exchange fluid may be used in the heat recovery unit 218, including water.

After leaving heat recovery unit 218 in line 220, the second cooled displacement fluid recycle stream may undergo any other processing (e.g., dehydration, compression, etc. as discussed for FIG. 1) and then be returned to an injection well where it is used as a displacement fluid.

Figure 3:
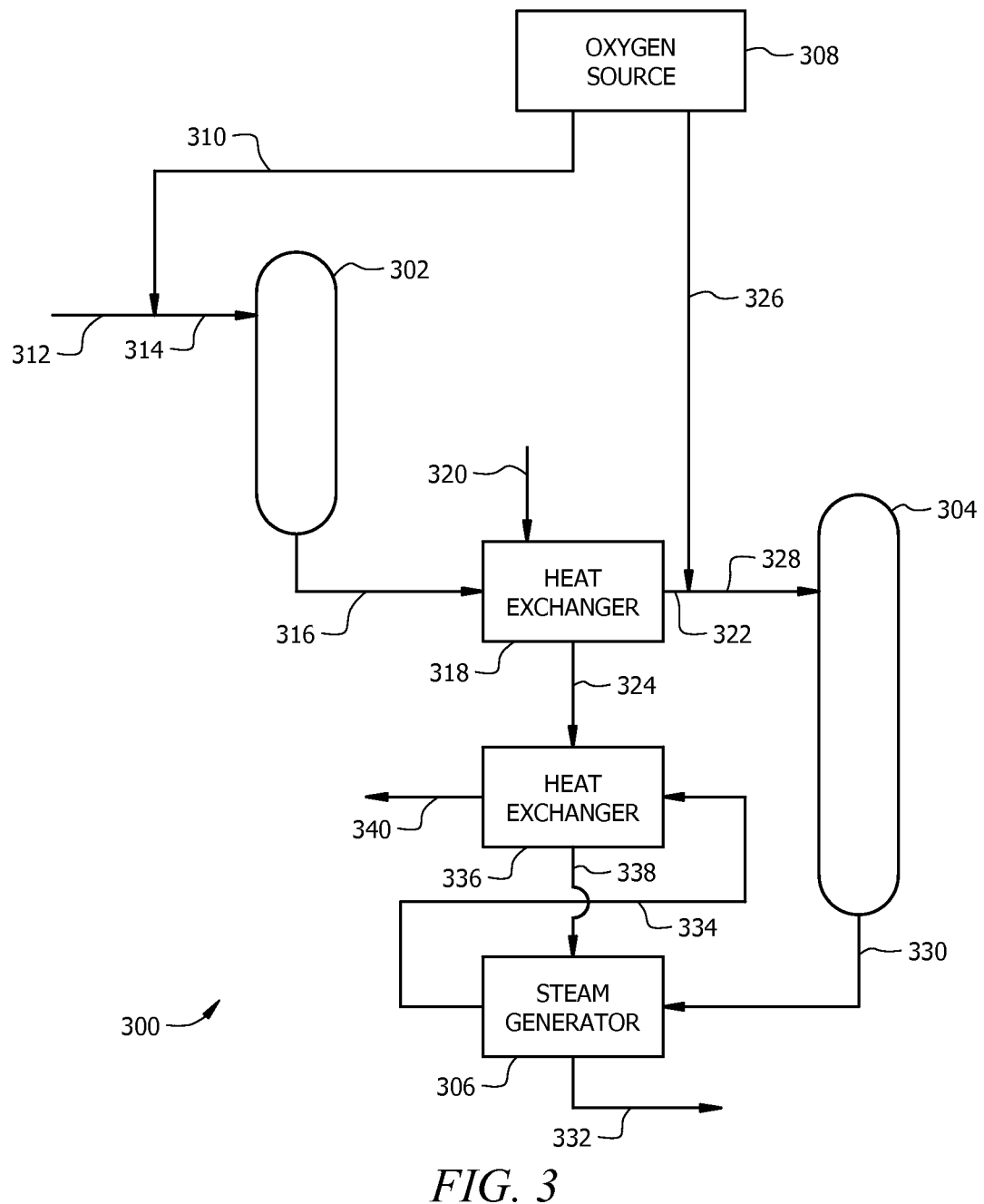
FIG. 3 is a schematic diagram of a two fixed bed reactor system.

FIG. 3 illustrates a system 300 that uses two fixed bed reactors 302, 304 and a separate steam generator 306. The two fixed bed reactors 302, 304 and steam generator 306 can be used in addition to, or in place of, the combined catalytic reactor 102 and boiler 132 in FIG. 1 and/or the single fixed bed reactor 202 and steam generator 204 in FIG. 2. Additionally, although the specific example in FIG. 3 shows two fixed bed reactors 302, 304, embodiments are not limited to any particular number of reactors and may include any number of reactors (e.g., 2, 3, 4, 5, etc.). As discussed previously, the chemical reactions that occur within reactors of the present disclosure may generate heat. In certain circumstances, it may be desirable to perform the chemical reactions in multiple steps to limit the amount of heat generated at any particular reactor and/or to optimize the capture of the heat energy.

System 300 optionally includes an oxygen source 308 (e.g., an oxygen generator 122 of FIG. 1, oxygen tanks, etc.). Oxygen may flow from the oxygen source 308 through a first oxygen-rich stream in line 310 (e.g., the gaseous stream in line 128 of FIG. 1) that combines with a displacement fluid stream in line 312 (e.g., sweetened displacement fluid stream of line 120 of FIG. 1) to form a combined stream in line 314 that is fed to the first fixed bed reactor 302. In alternative embodiments, lines 308 and 310 may feed to the reactor 302 separately. A portion of the contaminants in the displacement fluid stream in line 314 may undergo a catalytic chemical reaction to convert the contaminants to different chemicals. The chemical reactions also generate heat that increases the temperature of the first reacted displacement fluid recycle stream in line 316 as compared to the combined stream in line 314.

The first reacted displacement fluid recycle stream flows in line 316 and is fed to a heat exchanger 318. Heat exchanger 318 receives a water stream in line 320 that is used to cool the first reacted displacement fluid recycle stream received from line 316 which emits from the heat exchanger 318 as a first cooled displacement fluid recycle stream in line 322. The water stream in line 320 may be condensate from a power generator (e.g., power generator 136 of FIG. 1) and/or may be water from any other source. After cooling the first reacted displacement fluid recycle stream in the heat exchanger 318, the heated water exits heat exchanger 318 as a heated water stream in line 324. In addition, any suitable heat exchange fluid may be used in the heat exchanger 318, including water.

The first cooled displacement fluid stream in line 322 may be combined with a second oxygen-rich stream in line 326 (e.g., the gaseous stream in line 128 of FIG. 1) from oxygen source 308 to form a combined stream in line 328 that is fed to the second fixed bed reactor 304. A portion of the contaminants that remain in the first cooled displacement fluid stream received from line 322 may undergo catalytic chemical reactions to convert the contaminants to different chemicals in the second fixed bed reactor 304. The chemical reactions generate heat that increases the temperature of the second reacted fluid recycle stream in line 330 as compared to the first cooled displacement fluid recycle stream in line 328.

The second reacted displacement fluid recycle stream flows in line 330 and is fed to a steam generator 306. Steam generator 306 may absorb heat from the second reacted displacement fluid recycle stream received from line 330 to generate steam (e.g., which may emit from the steam generator 306 in line 332), which may be fed to a power generator (e.g., power generator 136 of FIG. 1) to produce electric power. Steam generator 306 may be a boiler, a heat exchanger, or any other apparatus configured to receive a second reacted displacement fluid recycle stream from line 330 and generate steam.

The second cooled displacement fluid recycle stream may flow from the steam generator 306 through line 334 and optionally passes through a second heat exchanger 336. Heat exchanger 336 cools the second cooled displacement fluid recycle stream received from line 334 using the heated water stream received from the first heat exchanger 318 in line 324. Additionally, heat exchanger 336 heats the water stream received from line 324 and outputs a second heated water stream in line 338 that is fed to steam generator 306 and is used to generate steam (e.g., see above for description of the steam generator 306). In addition, any suitable heat exchange fluid may be used in the heat exchanger 336, including water.

After leaving heat exchanger 336 in line 340, the third cooled displacement fluid recycle stream may undergo any other processing (e.g., dehydration in dehydrator 142 of FIG. 1 or in another dehydrator, compression in compressor 144 of FIG. 1 or another compressor, etc.) and then be returned to an injection well (e.g., injection well 106) where it is used as a displacement fluid.

Figure 4:
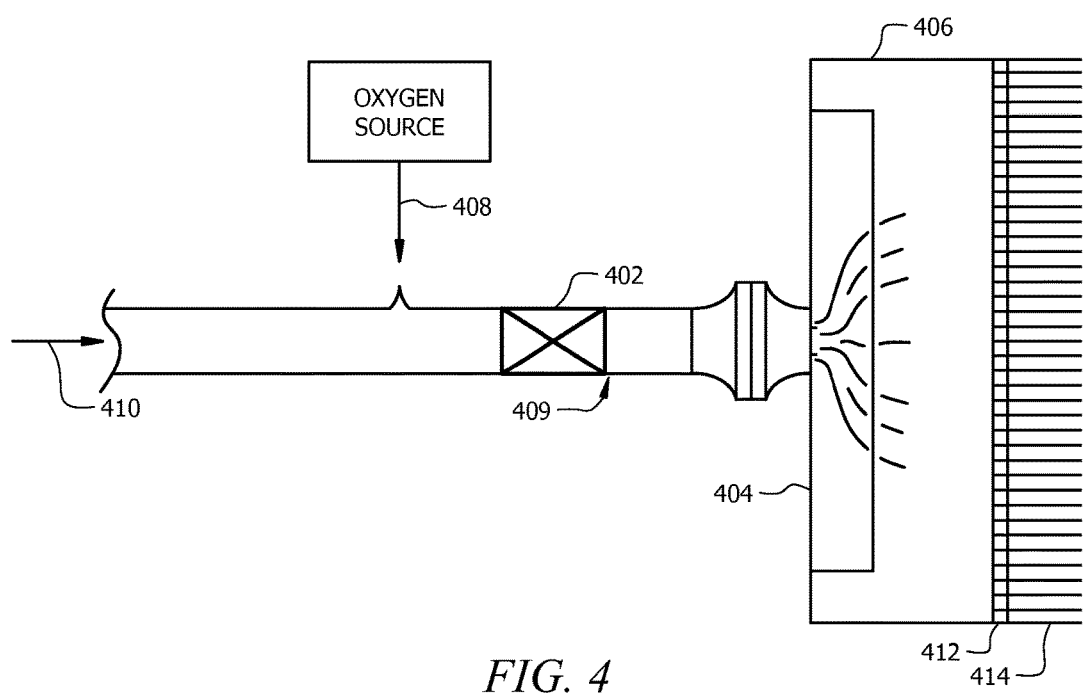
FIG. 4 is a schematic diagram of a mixer and distributer that can be used to feed a catalytic reactor.

FIG. 4 illustrates a mixer 402 and a distributer 404 that can be used to feed a catalytic reactor 406 (e.g., catalytic reactor 102 of FIG. 1, reactor 202 of FIG. 2, reactor 302 of FIG. 3, reactor 304 of FIG. 3, etc.). An oxygen-rich stream flowing through line 408 (e.g., the gaseous stream in line 128 of FIG. 1) and a displacement fluid recycle stream flowing through line 410 (e.g., line 120 of FIG. 1, line 206 of FIG. 2, line 312 of FIG. 3, line 322 of FIG. 3, etc.) may combine into a combined stream in line 409 (e.g., line 210 of FIG. 2, line 314 of FIG. 3, line 328 of FIG. 3, etc.) that is fed to mixer 402 (e.g., a static mixer) to blend the oxygen and the displacement fluid recycle stream. The blended stream is then output to the catalytic reactor 406 using a static or dynamic distributor 404 (e.g., a vane distributer). The distributor 404 widens a spraying angle of the blended stream such that the blended stream is more evenly distributed across a tube sheet 412 of catalytic reactor 406 (e.g., catalytic reactor 102 of FIG. 1, reactor 202 of FIG. 2, reactor 302 of FIG. 3, or reactor 304 of FIG. 3 may comprise a tube sheet such as tube sheet 412). The blended stream then enters the apertures of reactor tubes 414 that include at least one catalyst. While in the reactor tubes 414, contaminants within the blended stream received from line 409 may undergo chemical reactions to convert the contaminants to different chemicals as described above. The chemical reactions generate heat that increases the temperature of water or other heat exchange fluid known to those skilled in the art with the aid of this disclosure that is included along the outside of reactor tubes 414 to generate steam.

Figure 5:
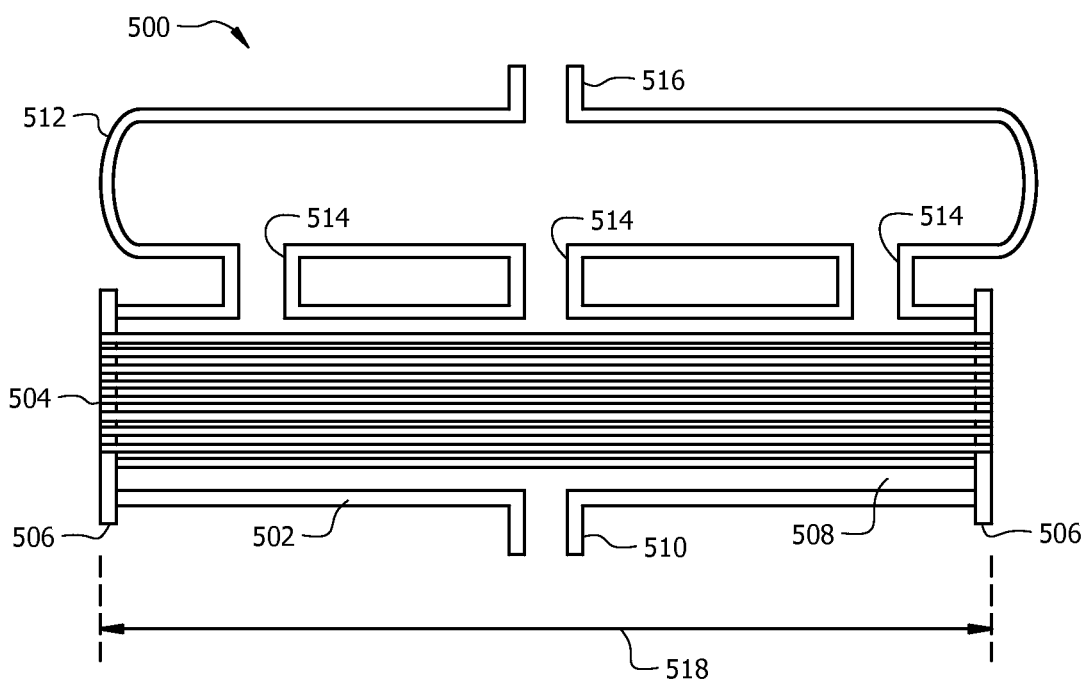
FIG. 5 is a side view of a catalytic reactor and a boiler.

FIG. 5 illustrates a side view of one embodiment of a combined catalytic reactor and boiler 500 (e.g., catalytic reactor 102 and boiler 132 of FIG. 1). The combined reactor and boiler 500 includes an outer shell 502 and one or more tubes 504 within the outer shell 502. Each tube 504 includes one or more catalyst, and a displacement fluid recycle stream enters and exits the tubes 504 through tube sheets 506. For instance, a displacement fluid recycle stream (e.g., from line 120 of FIG. 1, from line 206 or 210 of FIG. 2, from line 312 or 314 of FIG. 3, from line 322 or 328 of FIG. 3, etc.) can be sprayed across one of the tubes sheets 506 as is shown and described for FIG. 4. Within the outer shell 502 and outside of the tubes 504 is a cavity 508 that holds liquid water or other heat exchange fluid. The liquid (e.g., water or other heat exchange fluid) may enter through an entrance port 510. The liquid may come from condensate returned from a power generator. As the contaminants in the displacement fluid recycle stream in tubes 504 undergo chemical reactions which generate heat, the water outside of the tubes in cavity 508 heats up and some of the water boils into vapor (e.g., steam). The vapor exits to a vapor disengagement header 512 through one or more vapor entrance ports 514. From vapor disengagement header 512, vapor exits through one or more vapor exit ports 516 and eventually is fed to a power generator. Additionally, it should be noted that tubes 504 have a length 518. In an embodiment, length 518 may be selected based upon the surface area of tubes 504.

Figure 6:
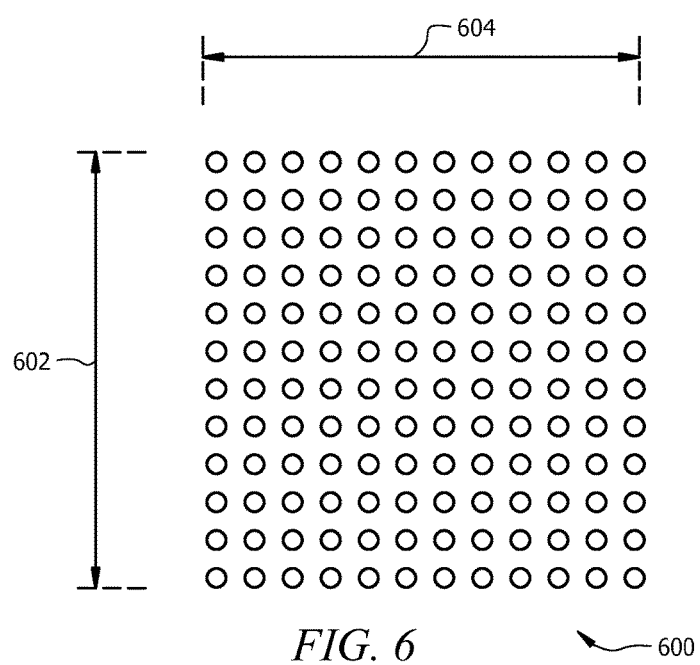
FIG. 6 is a front view of an array of catalytic reactor tubes.

FIG. 6 illustrates a front view of an array of catalytic reactor tubes 600. Array 600 has a height 602 and a width 604. In one embodiment, height 602 and width 604 are both about 48 inches, and array 600 includes tubes having diameters of about 2 inches and the tubes are spaced apart by about 2 inches (e.g., about 4 inches between the tube centers). In another embodiment, height 602 and width 604 are both about 36 inches, and array 600 includes tubes having diameters of about 2 inches and the tubes are spaced apart by about 1 inch (e.g., about 3 inches between the tube centers). However, embodiments are not limited to any number of tubes or dimensions, and embodiments may include any number of tubes having any dimensions. Moreover, a square array 600 is shown in FIG. 6; however, embodiments are not limited to square arrangements and may include, in addition or in the alternative, arrays that are circular, triangular, oval, pentagonal, hexagonal, etc. arrangements. Moreover, the tubes of array 600 are shown as having a circular cross-section; however, embodiments are not limited to circular cross sections and may include in addition or in the alternative cross-sections of other geometries, e.g., square, triangle, oval, pentagon, hexagon, octagon, etc.

Figure 7:
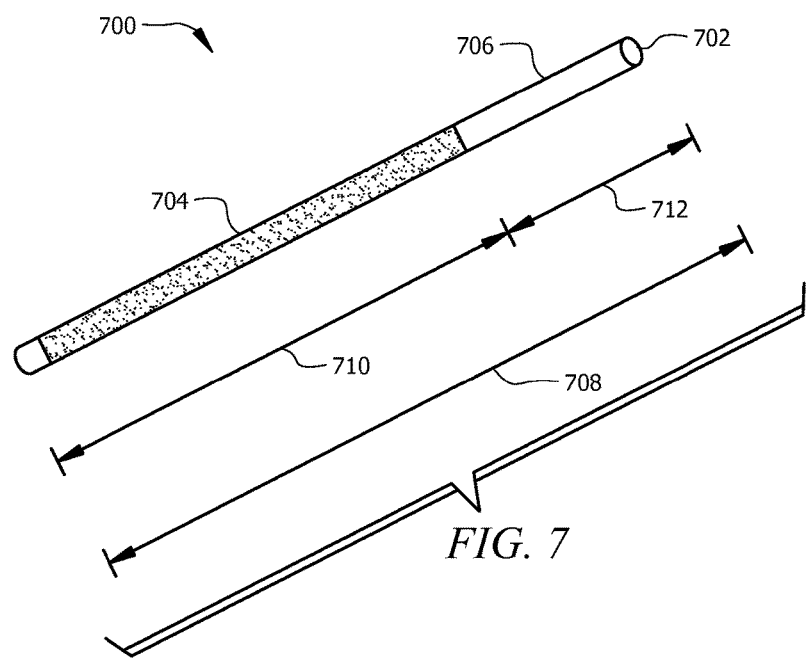
FIG. 7 is a schematic diagram of a catalytic reactor tube.

FIG. 7 is a perspective view of an embodiment of one catalytic reactor tube 700. Tube 700 may have a screen 702 that forms the outer surface tube 700. In one embodiment, tube 700 has a first portion 704 that contains one or more catalyst and a second portion 706 that does not contain any catalyst. The second portion may be configured such that the heat of the reactor 102 has time to transfer to the water on the other side of the tube 700. Tube 700 illustratively has an overall length 708, the first portion 704 has a length 710, and the second portion has a length 712. In one specific example, for illustration purposes only and not by limitation, overall length 708 is about 25 feet, first portion length 710 is about 20 feet, and second portion length 712 is about 5 feet. However, embodiments of tube 700 are not limited to any particular configuration and dimensions, and embodiments can include configurations and dimensions than the ones shown in FIG. 7.

Figure 8:
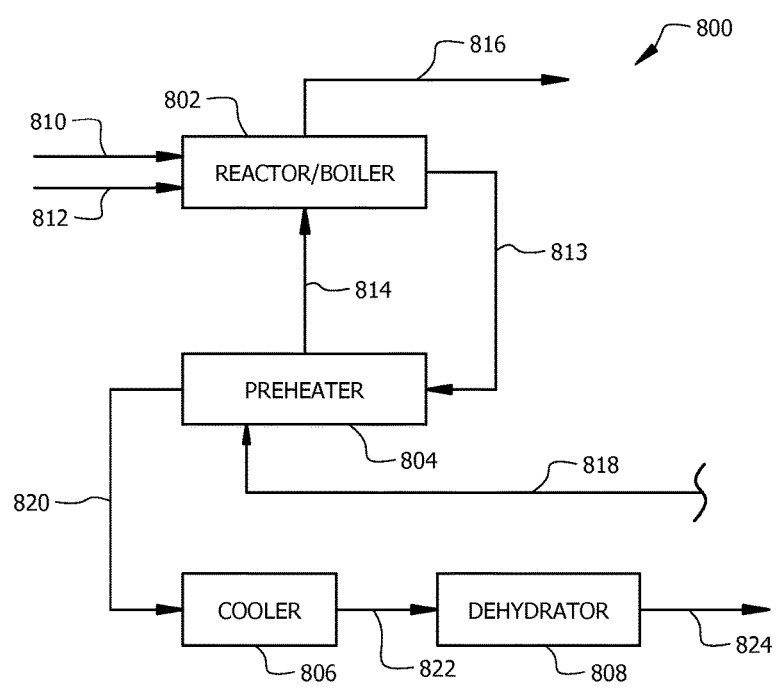
FIG. 8 is a block diagram of a catalytic reactor system with a preheater.

FIG. 8 is a block diagram of another embodiment of a catalytic reactor system 800. System 800 optionally includes a reactor/boiler 802 (e.g., reactor 102/boiler 132 of FIG. 1), a preheater 804, an air cooler 806, and a dehydrator 808 (e.g., dehydrator 142 of FIG. 1). A displacement fluid recycle stream flowing in line 810 (e.g., line 120 of FIG. 1) and an oxygen-rich steam flowing in line 812 (e.g., the gaseous stream flowing in line 128 of FIG. 1) may enter reactor/boiler 802. Displacement fluid recycle stream in line 810 may include carbon dioxide and hydrocarbons (e.g., methane, ethane, and/or propane). In one particular example, for illustration purposes only and not by limitation, displacement fluid recycle stream flowing in line 810 may include about 92 molar % carbon dioxide and about 8 molar % hydrocarbons. In one embodiment, the reacted displacement fluid recycle stream emitted from the reactor/boiler 802 in line 813 may have a temperature of about 500° Fahrenheit (F).

The heat generated from the chemical reactions in reactor/boiler 802 may be used to boil water or other heat exchange fluid received from line 814 to generate a vapor stream which emits from the reactor/boiler 802 in line 816. Input water stream or other heat exchange fluid in line 814 may be at a temperature of about 190° F., and vapor stream in line 816 may be at a temperature of about 470° F. and have a pressure of about 500 psi to about 700 psi (e.g., about 600 psi).

Preheater 804 may receive the reacted displacement fluid recycle stream emitted from the reactor/boiler 802 in line 813 and use it to preheat an input water (or other heat exchange fluid) stream received from line 818 (e.g., a water stream from condensate from a power generator). The input water or other heat exchange fluid stream in line 818 may have a temperature of about 100° F., and as previously mentioned, the resulting heated water or other heat exchange fluid stream flowing in line 814 may have a temperature of about 190° F.

The first cooled displacement fluid recycle stream exits the preheater 804 in line 820 at a temperature of about 200° F. and enters an air cooler 806 (e.g., a cooler that cools the stream received from line 820 using air). The air cooler 806 cools the first cooled displacement fluid recycle stream received from line 820 such that the second cooled displacement fluid recycle stream exits the air cooler 806 in line 822 at a temperature of about 120° F.

The second cooled displacement fluid recycle stream flowing in line 822 then enters the dehydrator 808 to remove all or about all of the water from the second cooled displacement fluid recycle stream received from line 822. This resulting final displacement fluid recycle stream which emits from the dehydrator 808 in line 824, may have a composition of about 99 molar % or more carbon dioxide.

In one embodiment, for every 10 million standard cubic feet per day (MMSCFD) of residue gas (e.g., displacement fluid recycle stream gas), 836 million British thermal units (MMBTU) of energy is generated. For example, a residue gas may have a stream composition of about 92 molar % carbon dioxide, about 6.8 molar % methane, about 0.8 molar % ethane, and about 0.4 molar % propane. Thus, the hydrocarbons comprise about 8 molar % of the residue gas, methane comprises about 85 molar % of the hydrocarbons, ethane comprises about 10 molar % of the hydrocarbons, and propane comprises about 5 molar % of the hydrocarbons. Methane has a heating value of 910 British thermal units per a standard cubic foot (BTU/SCF), ethane has a heating value of 1630 BTU/SCF, and propane has a heating value of 2180 BTU/SCF. This results in methane providing 910 BTU/SCF×0.85=773 BTU/SCF, ethane providing 1630×0.10=163 BTU/SCF, and propane providing 2180 BTU/SCF×0.05=109 BTU/SCF. Accordingly, the total BTU/SCF of the hydrocarbons is 773 BTU/SCF+163 BTU/SCF+109 BTU/SCF=1,045 BTU/SCF. Therefore, for 10 MMSCFD of residue gas with a hydrocarbon content of 8 molar %, the amount of energy generated is 0.08×10,000 MCFD×1045 BTU/SCF=836 MMBTU. The 836 MMBTU of energy generated results in 33.5 MMBTU of net energy being available. This is due in part to the requirements for heating and cooling the fluids described in the processes above. In other embodiments, the carbon dioxide recycle stream fed to the catalytic reactor has an energy content of 50 BTU/SCF or more or 100 BTU/SCF or more. However, embodiments are not limited to any particular energy content values and may include other values as well.

EXAMPLE

This prophetic example is made with reference to the system 100 of FIG. 1, which processes a gas that is similar to an actual displacement fluid recycle gas sample taken from a gas well. The following process data is predicted using a commercial process simulation software.

The displacement fluid recycle stream used in this prophetic example has the following composition:

| Well Gas Component | Concentration (mol %) | $C_{2+}$ Flow (gpm) | $C_{5+}$ Flow (gpm) |
|---|---|---|---|
| Nitrogen | 2.259 | 0.000 | 0.000 |
| Carbon Dioxide | 91.778 | 0.000 | 0.000 |
| Methane | 2.865 | 0.000 | 0.000 |
| Ethane | 0.769 | 0.206 | 0.000 |
| Propane | 0.652 | 0.180 | 0.000 |
| Iso-Butane | 0.133 | 0.044 | 0.000 |
| N-Butane | 0.301 | 0.095 | 0.000 |
| Iso-Pentane | 0.114 | 0.042 | 0.042 |
| N-Pentane | 0.091 | 0.033 | 0.033 |
| Hexanes and Heavier | 0.363 | 0.158 | 0.158 |
| $H_2S$ | 0.675 (6753.6 ppm) | 0.000 | 0.000 |

The gas of the above composition for processing in the system 100 has a specific gravity of 1.491 (measured at 600 psig and 131° F.), a gross wet heat content of 103 Btu/ft³ (measured at 14.650 psia and 60° F.), and a gross dry heat content of 105 Btu/ft³ (measured at 14.650 psia and 60° F.).

A gas of the above composition which is a miscible solution may flow as a displacement recycle stream from the recovery well 108 in line 111 at a pressure greater than or equal to atmospheric pressure through the one or more compressors 112, which compress the displacement fluid recycle stream to a pressure greater than about 300 psi and up to about 700 psi, for example, to a pressure of 500 psig. The compressed displacement fluid recycle stream then flows to the natural gas liquids (NGL) recovery unit 114 where $C_{3+}$ components are removed and recovered as NGL product 116 via line 115. The $C_{3+}$ components remaining in the displacement fluid recycle stream exiting the NGL recovery unit 114 in line 117 is:

| $C_{3+}$ Component in Line 117 | Concentration (mol %) |
|---|---|
| Propane | 1.87 |
| Iso-Butane | 0.00 |
| N-Butane | 0.06 |
| Iso-Pentane | 0.00 |
| N-Pentane | 0.00 |
| Hexanes and Heavier | 0.00 |

As can be seen, the concentration of propane in line 117 is lower than the concentration of propane in line 113; and iso-butane, n-butane, iso-pentane, n-pentane, and hexanes and heavier are completely removed from the gas in line 113 such that none of these components flow in line 117. The gas in line 117 may flow to the acid gas removal unit 118 where the $H_2S$ is removed completely for purposes of this prophetic example. The sweetened displacement fluid recycle stream of the following composition flows in line 120 to the catalytic reactor 102 at a pressure of 500 psig, a temperature of 120° F., and a molar flow rate of 20 MMSCFD, and a mass flow rate of 93,700 lb/hr:

| Component in Line 120 | Concentration (mol %) |
|---|---|
| Nitrogen | 1.57 |
| Carbon Dioxide | 92.11 |
| Methane | 3.39 |
| Ethane | 1.01 |
| Propane | 1.87 |
| Iso-Butane | 0.00 |
| N-Butane | 0.06 |
| Iso-Pentane | 0.00 |
| N-Pentane | 0.00 |
| Hexanes and Heavier | 0.00 |
| $H_2S$ | 0.00 |

In the catalytic reactor 102, the gas flowing from line 120 mixes with oxygen which flows from oxygen generator 122 via oxygen rich stream in line 128 and into the catalytic reactor 102 at a concentration of 100% oxygen, a pressure of 495 psig, a temperature of 120° F., a molar flow rate of 4 MMSCFD, and a mass flow rate of 14,000 lb/hr. The reaction(s) described herein are carried out in the catalytic reactor 102 such that hydrocarbon components are converted to carbon dioxide and the heat of the reactor 102 is used to generate steam in conjunction with the boiler 132 which provides steam to the power generator 136 for the generation of power as described hereinabove. The reacted displacement fluid recycle stream flows from the reactor 102 in line 130 at a pressure of 495 psig, a temperature of 2,454° F., a molar flow rate of 24.5 MMSCFD, a mass flow rate of 10,780 lb/hr, and having the following composition:

| Component in Line 130 | Concentration (mol %) |
|---|---|
| Nitrogen | 1.28 |
| Carbon Dioxide | 84.38 |
| Methane | 0.02 |
| Ethane | 0.00 |
| Propane | 0.00 |
| Iso-Butane | 0.00 |
| N-Butane | 0.00 |
| Iso-Pentane | 0.00 |

| Component in Line 130 | Concentration (mol %) |
|---|---|
| N-Pentane | 0.00 |
| Hexanes and Heavier | 0.00 |
| $H_2S$ | 0.00 |
| Water | 14.32 |

As can be seen, almost all of the methane, and all of the ethane, propane, and n-butane of line 120 was converted in the catalytic reactor 102 such that the reacted displacement fluid recycle stream in line 130 contains only 0.02 mol % methane, and 0.00 mol % of ethane, propane, butane, and heavier hydrocarbons. The reaction(s) in the catalytic reactor 102 generate water, which flows in the reacted displacement fluid recycle stream in line 130 with the other components of said stream to the dehydrator 142 where water is removed. The dehydrated displacement fluid recycle stream flows from the dehydrator 142 at a pressure of 495 psig, a temperature of 150° F., a molar flow rate of 21.2 MMSCFD, a mass flow rate of 101,200 lb/hr, and having the following composition:

| Component in Line 141 | Concentration (mol %) |
|---|---|
| Nitrogen | 1.48 |
| Carbon Dioxide | 97.41 |
| Methane | 0.02 |
| Ethane | 0.00 |
| Propane | 0.00 |
| Iso-Butane | 0.00 |
| N-Butane | 0.00 |
| Iso-Pentane | 0.00 |
| N-Pentane | 0.00 |
| Hexanes and Heavier | 0.00 |
| $H_2S$ | 0.00 |
| Water | 1.09 |

As can be seen, the concentration of water in the dehydrated displacement fluid recycle stream flowing from the dehydrator 142 in line 141 is 1.09 mol %, and the concentration of carbon dioxide is 97.41 mol %. The dehydrated displacement fluid recycle stream may flow via line 141 through one or more compressors such that the pressure of the gas is increased to a pressure in the range of 1,500 psig to 2,000 psi for reinjection into the injection well 106 via feed line 110.

As has been described above, embodiments of the present disclosure include a catalytic reactor for converting contaminants in a displacement fluid and generating energy. Certain embodiments may be beneficial in reducing the minimum miscible pressure of a carbon dioxide recycle stream, which can result in greater hydrocarbon recovery from a reservoir. Additionally, the heat generated by the catalytic reactor can be used to generate steam to operate a generator to produce power. Furthermore, the catalytic reactor can convert contaminants solely using catalytic reactions without the use of combustion. This can be useful in situations (e.g., high pressure and/or high carbon dioxide concentration) in which combustion is not possible.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru−R1), wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "about" with reference to a numerical value includes values which are ±10% with respect to the referenced numerical value. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving a carbon dioxide recycle stream that comprises hydrocarbons and 50 molar percent or more carbon dioxide;
   feeding the carbon dioxide recycle stream to a catalytic reactor at a pressure greater than about 300 pounds per square inch (psi);
   converting the hydrocarbons to carbon dioxide in the catalytic reactor by a catalytic reaction to form a purified carbon dioxide recycle stream, wherein the catalytic reactor comprises a shell and tube heat exchanger, wherein the shell and tube heat exchanger comprises an outer shell with a plurality of tubes within, wherein a volume of the shell and tube heat exchanger between the outer shell and the plurality of tubes is configured to boil a fluid, wherein a volume within the plurality of tubes comprises a catalytic material, wherein the catalytic material comprises a metal supported by an inorganic support, wherein the catalytic reaction occurs by passing the hydrocarbons through the catalytic material within the plurality of tubes, and wherein the catalytic reaction converts the hydrocarbons and oxygen to the carbon dioxide, water, and heat; and
   generating electrical energy by using the heat produced by the catalytic reactor in the conversion.

2. The method according to claim 1, further comprising removing $C_{3+}$ hydrocarbons from the carbon dioxide recycle stream before the carbon dioxide recycle stream is fed to the catalytic reactor.

3. The method according to claim 1, wherein the carbon dioxide recycle stream has an energy content greater than about 50 British thermal units per standard cubic foot (BTU/SCF).

4. The method according to claim 1, further comprising feeding the purified carbon dioxide recycle stream to a hydrocarbon injection well.

5. The method according to claim 1, wherein generating the electrical energy comprises producing steam from the heat generated by the catalytic reactor and operating an electrical generator using the steam.

6. The method according to claim 1, wherein the metal comprises one or more of nickel, iron, and a noble metal, and wherein the inorganic support comprises one or more of silica and alumina.

7. The method according to claim 6, wherein the noble metal comprises one of palladium, platinum, silver, gold, iridium, osmium, rhodium, and ruthenium.

8. A method comprising:
   receiving a recycle stream that comprises carbon dioxide, $C_1$-$C_2$ hydrocarbons, and $C_{3+}$ hydrocarbons;
   separating the $C_{3+}$ hydrocarbons from the carbon dioxide and the $C_1$-$C_2$ hydrocarbons;
   feeding the carbon dioxide and the $C_1$-$C_2$ hydrocarbons to a catalytic reactor at a pressure greater than about 300 pounds per square inch (psi); and
   converting the $C_1$-$C_2$ hydrocarbons and oxygen to carbon dioxide, water, and heat in a catalytic reaction,
   wherein the catalytic reactor comprises a shell and tube heat exchanger,
   wherein the shell and tube heat exchanger comprises an outer shell with a plurality of tubes within,
   wherein a volume of the shell and tube heat exchanger between the outer shell and the plurality of tubes is configured to boil a fluid,
   wherein a volume within the plurality of tubes comprises a catalytic material,
   wherein the catalytic material comprises a metal supported by an inorganic support, wherein the catalytic reaction occurs by passing the hydrocarbons through the catalytic material within the plurality of tubes, and wherein the catalytic reaction converts the $C_1$-$C_2$ hydrocarbons and the oxygen to the carbon dioxide, the water, and the heat using the catalytic material in the catalytic reactor.

9. The method according to claim 8, wherein the recycle stream is received from a hydrocarbon recovery well, and wherein the method further comprises feeding a purified carbon dioxide recycle stream to a hydrocarbon injection well.

10. The method according to claim 8, further comprising:
separating air into oxygen and nitrogen; and
feeding the oxygen to the catalytic reactor.

11. The method according to claim 8, further comprising generating energy using the heat.

12. The method according to claim 8, wherein the metal comprises one or more of nickel, iron, and a noble metal, and wherein the inorganic support comprises one or more of silica and alumina.

13. A set of process equipment comprising:
a natural gas liquids (NGL) recovery unit configured to receive a recycle stream comprising carbon dioxide, $C_1$-$C_2$ hydrocarbons and $C_{3+}$ hydrocarbons, and to separate the recycle stream into an NGL stream and a carbon dioxide recycle stream, wherein the NGL stream comprises $C_{3+}$ hydrocarbons, and wherein the carbon dioxide recycle stream comprises carbon dioxide and $C_1$-$C_2$ hydrocarbons;
a catalytic reactor configured to receive the carbon dioxide recycle stream and convert the $C_1$-$C_2$ hydrocarbons in the carbon dioxide recycle stream to carbon dioxide by a catalytic reaction to produce a purified carbon dioxide recycle stream, wherein the catalytic reaction converts the $C_1$-$C_2$ hydrocarbons to the carbon dioxide using a catalyst in the catalytic reactor, wherein the catalytic reactor comprises a shell and tube heat exchanger, wherein the shell and tube heat exchanger comprises an outer shell with a plurality of tubes within, wherein a volume of the shell and tube heat exchanger between the outer shell and the plurality of tubes is configured to boil a fluid, wherein a volume within the plurality of tubes comprises a catalytic material, wherein the catalytic material comprises a metal supported by an inorganic support, wherein the catalytic reaction occurs by passing the hydrocarbons through the catalytic material within the plurality of tubes, and wherein the catalytic reaction converts the $C_1$-$C_2$ hydrocarbons and oxygen to the carbon dioxide, water, and heat; and
a dehydrator configured to remove the water from the purified carbon dioxide recycle stream and feed the dehydrated purified carbon dioxide recycle stream to a hydrocarbon injection well for use in an enhanced oil recovery operation.

14. The set of process equipment according to claim 13, wherein the shell and tube heat exchanger is configured to generate steam.

15. The set of process equipment according to claim 14, further comprising a steam turbine power generator that is configured to use the steam from the shell and tube heat exchanger to generate electricity.

16. The set of process equipment according to claim 13, further comprising an oxygen generator that is configured to feed the catalytic reactor with oxygen that is generated by separating air into oxygen and nitrogen.

17. The set of process equipment according to claim 13, further comprising an acid gas removal unit positioned between the NGL recovery unit and the catalytic reactor, wherein the acid gas removal unit is configured to remove acid gases from the carbon dioxide recycle stream.

18. The set of process equipment according to claim 13, wherein the metal comprises one or more of nickel, iron, and a noble metal, and wherein the inorganic support comprises one or more of silica and alumina.

* * * * *